Jan. 3, 1961   R. E. SPOKES ET AL   2,966,737
FRICTION ELEMENTS
Filed Jan. 30, 1958   2 Sheets-Sheet 1
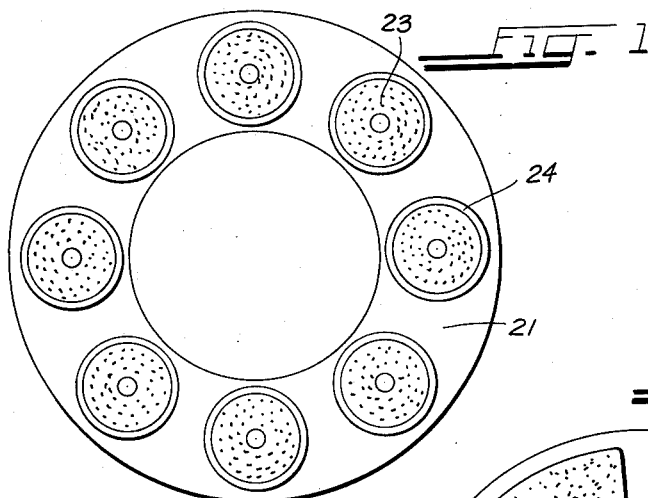
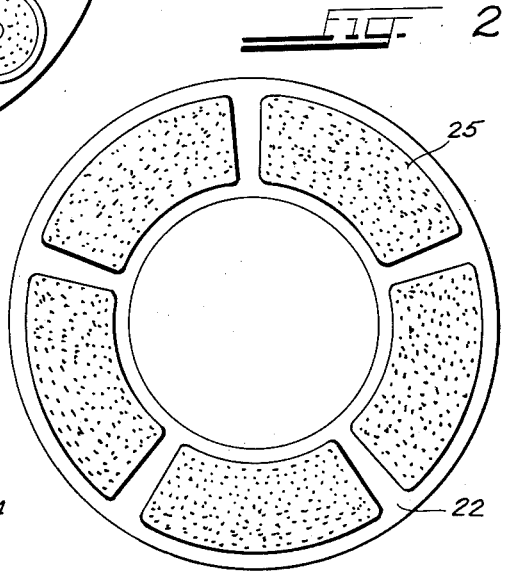
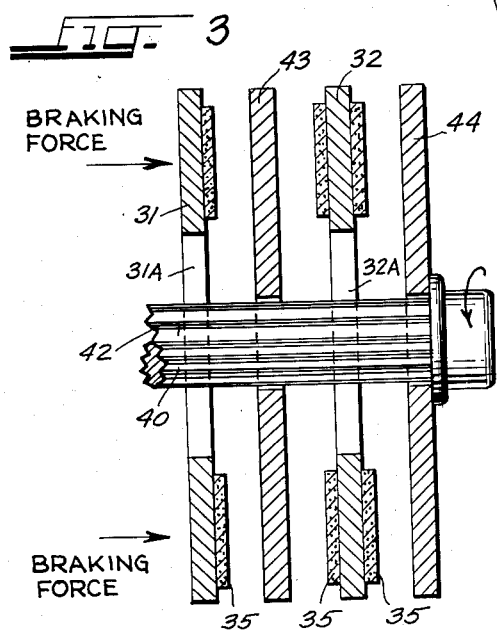
INVENTORS:
RAYMOND E. SPOKES
FRANK W. SMITH
BY
Wallace and Cannon
ATTYS.

United States Patent Office — 2,966,737
Patented Jan. 3, 1961

2,966,737

FRICTION ELEMENTS

Raymond E. Spokes, Ann Arbor, Mich., and Frank W. Smith, Hackensack, N.J., assignors to American Brake Shoe Company, New York, N.Y., a corporation of Delaware Filed Jan. 30, 1958, Ser. No. 712,234

6 Claims. (Cl. 29—182.5)

The severe kinetic energy conditions encountered as for example in the braking of intercontinental military aircraft and four engine commercial aircraft have necessitated basic changes and alterations in friction elements employed in the brake. By and large, it is recognized that what is required in the first instance is a metallic friction element preferably of powdered metal. A powdered metal friction element by itself does not develop effectively the frictional characteristics required to produce satisfactory braking, and accordingly, various types of mineral friction enhancing fillers have been proposed to be incorporated in a powdered metal friction element for braking large aircraft. The ideal friction enhancer would, of course, be one which undergoes no physical or chemical or mineralogical change during braking while affording the desired friction characteristics and achieving the desired optimum life and torque conditions.

We have discovered that optimum friction characteristics can be best realized in a friction element of the foregoing kind by having resort to a fibrous mineral body which is, first, sufficiently strong and of such physical nature as to remain intact in the powdered metal matrix and wear away at its exposed surface without undergoing fusion in whole or in part and without undergoing any change tending to reduce friction; and secondly, one which will remain dimensionally stable during the use and application of the friction element under high energy applications and which will not undergo any significant chemical or mineralogical change during the sintering process encountered in production of the element or within the temperature limits of high energy braking which would destroy even in part the full fibrous characteristic by formation of vitreous separable products which still tend to migrate and reduce friction and detract from the essential fibrous nature of the mineral body as originally incorporated in the friction element.

This is found to be fulfilled through use of one specific member of the aluminum silicate family known as sillimanite, in a naturally occurring pure form. Sillimanite is sometimes found naturally mixed with other mineral deposits from which it can be concentrated to a pure form. Sillimanite also occurs in massive deposits, notably in India, and by massive is meant a pure vein or mother lode which, as mined, requires no concentration. This is our preferred source of sillimanite since such assures the full effect of the per se sillimanite bodies. We can, of course, use pure naturally occurring sillimanite obtained by concentration techniques from deposits contaminated with other minerals, and it is the primary object of the present invention to incorporate pure naturally occurring sillimanite in a metallic matrix to afford a friction element.

Other and further objects will be apparent from the following description which by way of example describes preferred embodiments of the invention and the principle thereof and what is now considered to be the best mode contemplated for applying that principle. Other embodiments of the invention embodying the same or equivalent principle may be used and changes may be made as described by those skilled in the art without departing from the present invention and the purview of the appended claims.

In the drawings:

Figs. 1 and 2 are schematic plan views of friction couple members provided with friction elements of the present invention;

Fig. 3 is a simplified and somewhat schematic sectional view of a friction couple.

Figure 4:
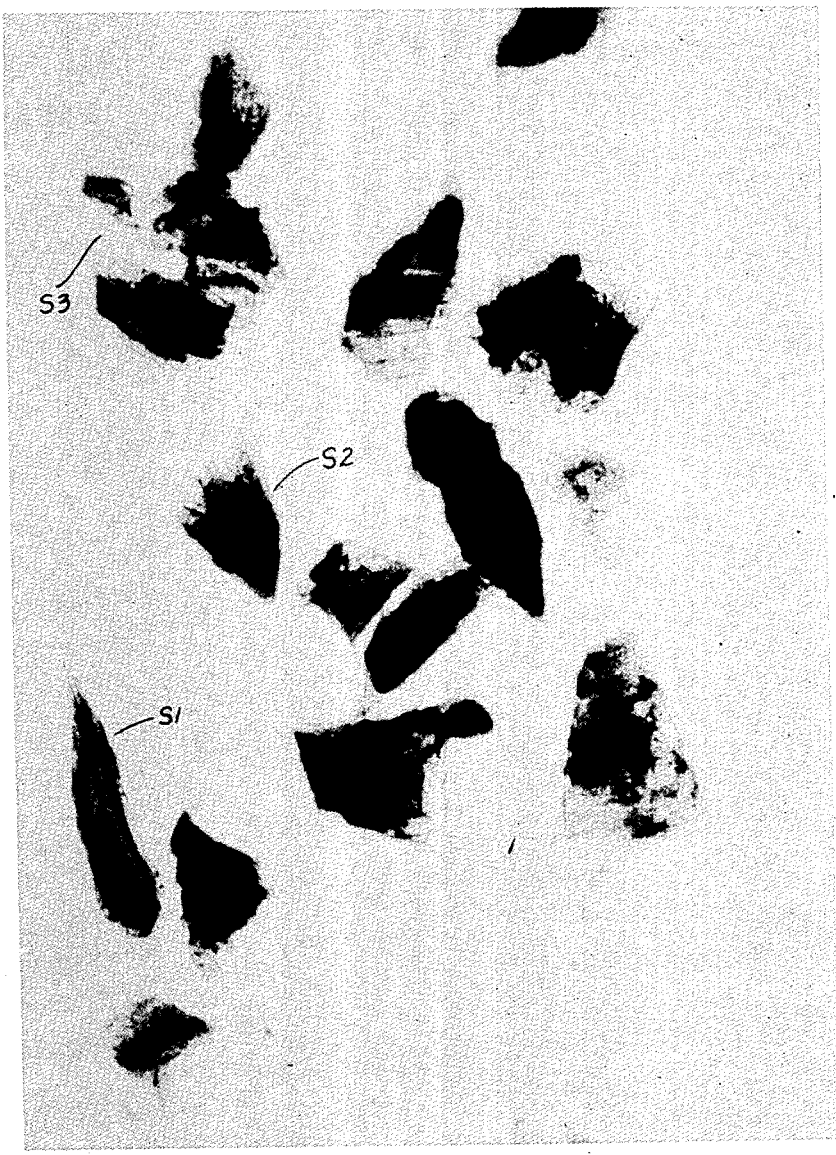
Fig. 4 is a microphotograph of pure sillimanite.

Sillimanite is a member of the aluminum-silicate family, having the chemical composition $Al_2SiO_5$, and crystallizes in the orthorhombic system. Sillimanite occurs naturally as sharp, elongated, highly angular and rough faced bodies, each naturally occurring sillimanite body consisting of an aggregate of parallel to sub-parallel crystals. The crystals of sillimanite embodied in the naturally occurring bodies are often bent, striated, interlaced, and poorly terminated, and as such are readily susceptible to firm anchoring in a powdered metal matrix. The crystal fracture is uneven and the cleavage is macropinacoidal.

Sillimanite has a hardness of 6 to 7 and a specific gravity of about 3.10 to 3.23 and in appearance each per se crystal is transparent to translucent. The formula for sillimanite is sometimes reported as $Al_2OSiO_4$, and the mineral is often found naturally in gneisses, quartzites, mica schists and other metamorphic rocks from which the sillimanite agglomerate bodies are easily concentrated by known concentration methods to eliminate the other mineral impurities. It will be realized from this that naturally occurring sillimanite bodies are inherently strong because of the aggregate nature thereof, and being elongated and angular with the crystals interlaced can be readily anchored in a powdered metal matrix.

Fig. 4 is a microphotograph ($\times 36$) of naturally occurring sillimanite of $-20$ to $+60$ mesh size for incorporation in a friction element in accordance with the present invention, and the foregoing characteristics of sillimanite are readily discernible in Fig. 4, particularly the sillimanite bodies marked S1, S2 and S3.

Sillimanite is highly resistive to calcination, and does not undergo chemical change or physical break-down or partake of changes in mineral phases, up to temperatures at least as high as 1550° C. This particular characteristic is of importance in a friction element for high energy applications where the temperatures encountered at the interfacial area between the friction element and its opposing member or so-called rotor at the time of engagement may be near or appreciably upwards of 2000° F. A thermally unstable body confined to such temperature for even a short time could easily undergo calcination or physical disruption, but sillimanite is stable at such normally expected temperatures encountered during high energy braking and the like and hence will remain substantially unchanged in both physical and mineralogical form. Accordingly, when embodied in a friction element having a powdered metal matrix sillimanite, massive or concentrated, will retain its highly angular and heavy bodied form and will not undergo chemical break-down into constituents such as vitreous forms of alumina and silica which would represent vitreous migratable free bodies in the nature of finely particulated glass or like fused ceramic causing reduction in friction. Additionally, sillimanite by virtue of its elongated crystal form and its resistance to calcination enables the friction in a friction element incorporating naturally occurring sillimanite bodies to remain substantially constant with no decay, and the permanence of its heavy-bodied structure does not depend upon the presence of a potentially disruptible bond for maintaining the highly desirable massive structure. That resistance to vitrification and the absence of vitrified products is highly desirable in a friction element can be realized from the fact that a smooth glazed vitreous surface on a friction element would result in poor friction characteristics. Hence, a friction enhancing agent such as natural sillimanite which is non-vitreous to begin with and advantageously fibrous and heavy bodied in structure and which contains no vitrified components within its structure, or components capable of being vitrified at high energy braking temperatures, represents a highly advantageous friction enhancing material in a powdered metal friction element in accordance with the present invention.

A powdered metal matrix is a well known matrix for friction elements and has been constantly used in the art in recent years. Its chief advantage, especially if composed of good heat conductive material such as iron and especially copper powders, is its ability to be readily shaped by powdered metal techniques and to conduct heat away from the area of interface engagement with the rotor or opposing member of the friction couple. Additionally, being of metal, such matrix resists thermal breakdown and thermal warpage in the first instance, and it inherently conducts heat rapidly away from the engaging face thereof and into the "sink" of the backing or support member (which carries the friction element) and the elements beyond the support member.

The essential nature and desirable attributes of a powdered metal matrix are well known in the friction element art, and the particular composition will for the most part be varied in accordance with operating conditions. The strongest form for the most severe situations of mechanical shock and wear is represented by powdered iron, but powdered copper or bronze can for the most part be advantageously employed just as well, being more ductile than iron and also more heat conductive. Whatever be the nature of the powdered metal matrix, particles of naturally occurring highly angular sillimanite of the kind shown in Fig. 4, is mixed with the metal powders before sintering, and it may be of advantage in some instances to add to the mixture a friction modifier or lubricant such as finely divided lead or graphite or both.

There is nothing particularly critical about proportions. The matrix is essentially a binder for the particles of massive sillimanite, having the advantageous characteristics mentioned above, and hence sufficient of the metal powders to be sintered are selected which will assure an effective bonding of the particulated massive sillimanite filler. From the standpoint of mechanical strength, it is desirable to use as little sillimanite as is consistent with an optimum effect. On the other hand, no more sillimanite need be used beyond that required to produce an optimum friction and wear level, since any massive sillimanite beyond this amount would be waste and surplusage. Therefore, the naturally occurring sillimanite content in the friction element may be as low as about five percent based on the total weight of the friction element as representative of the lower range where an operative effect of the sillimanite is present. On the other hand, the sillimanite content may be raised up to a percentage of about fifty percent to develop the highest effective action of sillimanite within the realm of effective bonding by the sintered powdered metals.

If graphite (−325 mesh) or lead is to be used as a friction modifier, such will not ordinarily exceed about ten percent by weight of the friction element composition. As is well known in the art, a friction modifier is simply a lubricant when viewed from the relative standpoint of the essential friction enhancing material, which is naturally occurring sillimanite in the present instance, and is usually added in specialized circumstances where, for some reason or other, it is beneficial to tone down or make less harsh the action of the friction enhancer.

Suitable examples representing formulations in accordance with the present invention are as follows:

*Example 1.—Broad range*

Material: Percent by weight
- Powdered metal (iron or copper _____ 95–50
- Naturally occurring sillimanite bodies (−20 +60 mesh) _____ 5–50

Example 1 is to be followed as the basis for the extremes of possible variations in selecting the basic components or essential ingredients. As was mentioned, friction modifiers may be added contributing their own distinct effects, and some tin will in most instances be used as an aid to sintering and coalescence. Thus, more specific examples are as follows:

*Example 2.—Iron base*

Material: Percent by weight
- Powdered iron _____ 70–85
- Naturally occurring sillimanite bodies (−20 +60 mesh) _____ 5–15
- Powdered tin _____ 5–10
- Finely divided graphite (−325 mesh) ___ 3–10

*Example 3.—Copper base*

Material:
- Powdered copper _____ 60–85
- Naturally occurring sillimanite bodies (−20 +60 mesh) _____ 5–15
- Powdered tin _____ 5–8
- Finely divided graphite (−325 mesh) ____ 3–10

The above examples represent the mixture to be pressed and sintered. The constituents are mixed to a uniformly distributed state, and a selected quantity is then introduced into the mold for compaction under pressure. The mold embodies the dimensions of the finished part, and although hot-pressing may be used, that is, combined pressing and sintering, we prefer to first press the powders under high pressure to produce a so-called green compact densified to the desired state by pressure. The compact is then sintered under light pressure for a period of time and at a temperature known to produce welding or fusion joining of the metal powders, and at the completion of sintering the individual sillimanite bodies are effectively anchored in place and an operative friction element is produced. There is no alteration chemically or mineralogically of the sillimanite bodies during sintering, because the sintering temperature is well below the calcining or phase-changing temperature of naturally occurring sillimanite.

In the instance of a copper base powdered metal matrix, some tin is advantageously employed as set forth in the examples for promoting the fusion union of the copper powders, forming some bronze, and at least five parts by weight of tin may likewise be employed for this purpose in the instance of a matrix consisting essentially of iron powders contributing to coalescence. Sintering is, of course, carried out at a somewhat higher temperature for iron, say at about 1800–2000° F., in contrast to the sintering temperature for copper base materials which is in the realm of 1500–1700° F. These temperatures are well below the calcination temperature of sillimanite which is about 2822° F.

The pressing and sintering conditions for copper and iron powders have long been established in the art. The pressures used to produce the green compacts also vary with the matrix material. For an iron base matrix, pressures of between fifteen to twenty tons per square inch are used, depending upon the most advantageous density desired for the matrix as determined by the particular kind of installation. Because of the softer nature of copper, like variations in density are attained by using lower pressures of about eleven to fifteen tons per square inch. Sintering is preferably conducted using a slight pressure, of the order of 150 p.s.i. for about one hour at 1600° F. in the instance of a copper base matrix containing ten to fifteen percent by weight of naturally occurring sillimanite bodies of about −20 to +60 mesh (Example 2) and a pressure of about 250 p.s.i. at 1800° F. for one hour with an iron base matrix containing ten to fifteen percent by weight of naturally occurring sillimanite bodies of about −20 to +60 mesh (Example 3). Such relatively low order pressures during sintering are to be distinguished from so-called hot-pressing wherein both compaction of the loose powders and sintering thereof are carried out simultaneously, although as mentioned, this later technique may be employed within the purview of the present invention.

The friction elements consisting of the sintered materials are mounted on a supporting member or so-called stator of the desired form and dimension to be embodied in the aircraft brake or like friction couple. Again, we rely upon known practices in this regard, but it may be mentioned that the friction element can be either joined mechanically to the stator, or fusion bonded thereto by plating the stator with copper or nickel and then heating the assembly to a temperature sufficient to produce a weld between the stator and the friction element juxtaposed thereon, slight pressure being used to assure good contact between the plated stator and the back of the friction element.

Friction elements of the kind contemplated by the present invention are illustrated in Figs. 1 and 2 as mounted on ferrous metal stators 21 and 22. The stators in each instance are annular as illustrative of one mechanical form of a stator for a high energy brake, but the shape of the stator will vary depending upon the particular type of brake structure, or clutch structure where the present invention is embodied in a high energy industrial clutch. In Fig. 1, the friction elements are in the form of discs or buttons 23 each composed in accordance with the present invention disclosed above, and in this instance the buttons 23 are contained in a complemental cup 24 which may be mechanically joined at the back in a suitable fashion to the stator 21.

In Fig. 2 of the drawing, the friction elements are in the form of arcuate segments 25 each of the composition of the present invention, and these segments are bonded to the stator 22 by fusion welding described above.

Fig. 3 of the drawing schematically illustrates the essentials of an aircraft brake structure in which friction elements of the present invention are secured to a stator. Thus, the brake couple illustrated in Fig. 3 comprises a pair of annular stators 31 and 32 having enlarged openings 31A and 32A in the medial portions thereof, thus being similar to the stators of Figs. 1 and 2. The stator 31 is provided on one side with a plurality of friction elements 35 of the present invention which may be of the form illustrated in Figs. 1 or 2, and it will be observed that the stator 32 has like friction elements provided on both sides thereof. The shaft 40 relative to which the stators 31 and 32 are concentrically supported in a convenient manner (not shown) can be assumed to be the rotating axle of an aircraft wheel. The stators do not rotate with the axle but can be moved axially therealong. The axle is splined at 42 or otherwise provided with keys for rotating a pair of discs 43 and 44 which are provided with teeth which fit complementally in the spaces between the splines or keys on the axle 42. Hence, the discs are adapted to move axially along the splines or keys 42 while rotating with the axle. The discs 43 and 44 represent the so-called opposing members for the stators 31 and 32, such that by applying a hydraulic braking force to at least the outermost of the stators as indicated by legend in Fig. 3, the friction elements are brought into tight engagement with the rotating discs 43 and 44 thereby applying a retarding braking force to the axle 40.

It will be seen from the foregoing that under the present invention we are able to use, in the powdered metal matrix of a high energy friction element, naturally occurring bodies of sillimanite. The sillimanite bodies are highly heat stable and will not calcine or undergo change at the expected high temperatures encountered during use of the friction element. Moreover, the heavy bodied and highly angular nature of naturally occurring sillimanite assures a firm anchorage in the powdered metal matrix, lessening wear and thereby increasing the life of the friction element, and by the same token highly effective initial engagement between the friction element and the opposing member of the friction couple.

The actual friction couple incorporating the friction element of the present invention may take different forms in use, as for instance in an aircraft brake, or in a heavy duty brake for industrial equipment, or even in a heavy duty clutch for industrial equipment operating in oil, wherever exceptional high kinetic energy conditions or resultant high temperatures require. While we have referred to "pure" naturally occurring sillimanite, it will be realized that we mean commercially pure naturally occurring sillimanite, that is, as-mined sillimanite (massive sillimanite), or naturally occurring sillimanite as concentrated from the mine having the lowest practical impurity content within the realm of commercial concentrating techniques. The massive form is, of course, concentrated naturally to a purity state equivalent to commercially concentrated, as-mined, naturally occurring sillimanite.

Hence, while we have described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A friction couple member comprising a rigid metallic supporting member and a friction element for high energy applications secured thereto, said friction element consisting essentially of a thermally stable heat-conductive metallic matrix having dispersed therein bodies of aluminum silicate mineral consisting essentially only of highly angular naturally occurring substantially pure sillimanite, each such body being an agglomeration of parallel to sub-parallel interlaced substantially pure sillimanite crystals having the formula $Al_2SiO_5$, a hardness of 6–7, a specific gravity of about 3.10 to 3.23, crystallizing in the orthorhombic system, and heat stable up to temperatures at least as high as about 1550° C.

2. A friction member according to claim 1 wherein said bodies of sillimanite are present in an amount of about five to fifty percent by weight of the friction element.

3. A friction member according to claim 2 wherein the matrix is composed primarily of a metal selected from the group consisting of pressed and sintered powdered iron and copper.

4. A powdered metal friction element for high energy applications and consisting essentially of a thermally stable heat-conductive matrix of powdered metal particles densified under high pressure and sintered together to join the individual particles of metal rigidly and permanently one to the other, and said matrix having dispersed therein bodies of aluminum silicate mineral consisting essentially only of highly angular naturally occurring substantially pure sillimanite, each such body being an agglomeration of parallel to sub-parallel interlaced sillimanite crystals having the formula $Al_2SiO_5$, a hardness of 6–7, a specific gravity of about 3.10 to 3.23, crystallizing in the orthorhombic system and heat stable up to temperatures at least as high as 1550° C.

5. A friction element according to claim 4 wherein the matrix is a metal selected from the group consisting of powdered iron and copper and wherein bodies of sillimanite are present in an amount of between five and fifty percent by weight of the friction element.

6. A friction element for high energy applications consisting essentially of a metallic matrix, and said matrix having dispersed therein bodies of aluminum silicate mineral consisting essentially only of highly angular naturally occurring substantially pure sillimanite, each such body being an agglomeration of parallel to subparallel interlaced substantially pure sillimanite crystals having the formula $Al_2SiO_5$, a hardness of 6–7, a specific gravity of about 3.10 to 3.23, crystallizing in the orthorhombic system and heat stable up to temperatures at least as high as about 1550° C.

References Cited in the file of this patent

UNITED STATES PATENTS

| | | |
|---|---|---|
| 2,784,105 | Stedman et al. | Mar. 5, 1957 |
| 2,806,570 | Markus | Sept. 17, 1957 |
| 2,818,634 | Batchelor et al. | Jan. 7, 1958 |
| 2,835,367 | Steck | May 20, 1958 |